Oct. 26, 1937.  E. S. DE HART  2,097,365
AUTOMATIC MOISTURE DIFFUSING APPARATUS
Filed Sept. 12, 1935    7 Sheets-Sheet 1
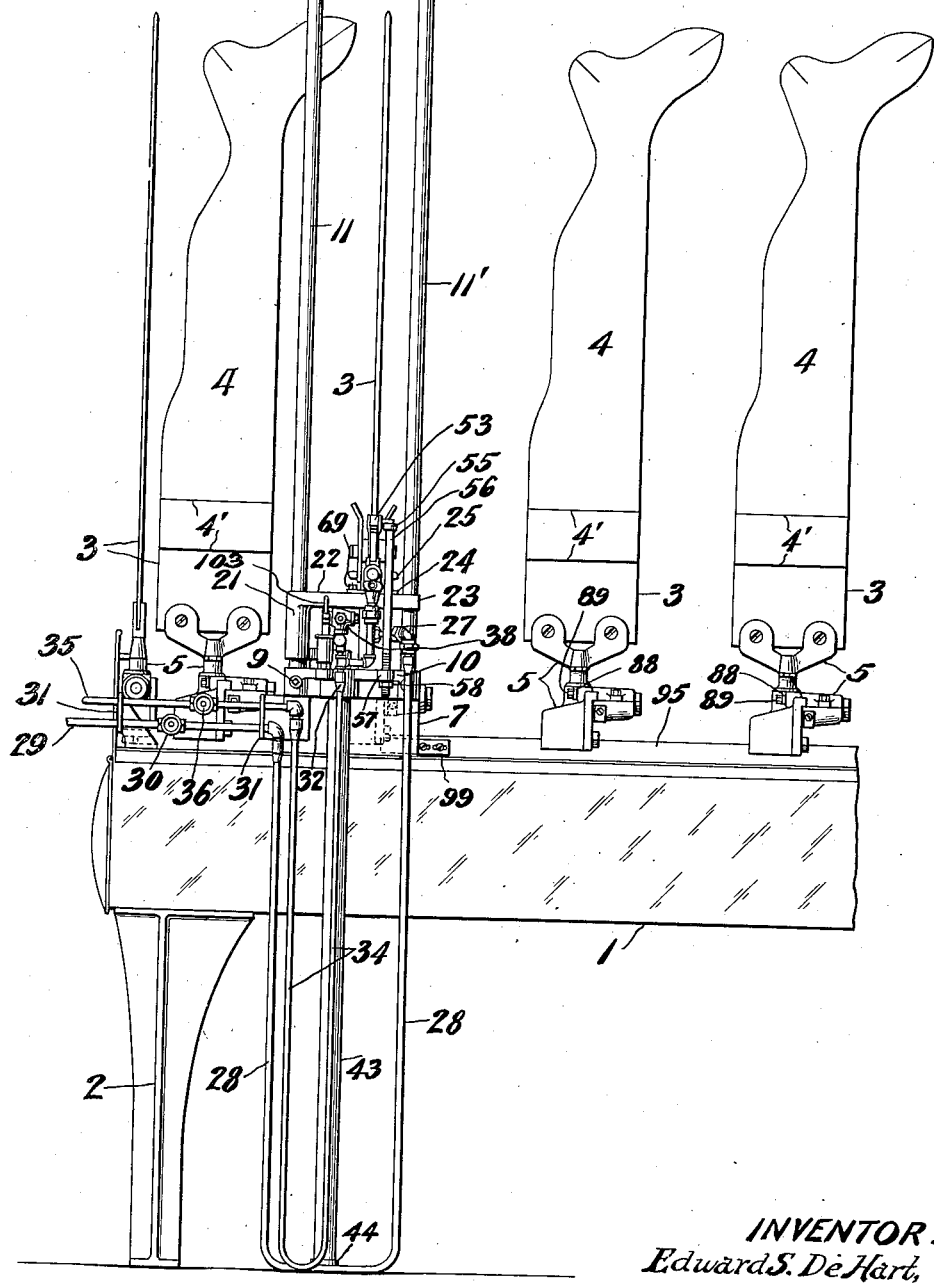
FIG. I.
INVENTOR:
Edward S. De Hart,
BY Alfred J. Bratton
HIS ATTORNEY.

Oct. 26, 1937.　　　　E. S. DE HART　　　　2,097,365
AUTOMATIC MOISTURE DIFFUSING APPARATUS
Filed Sept. 12, 1935　　　7 Sheets-Sheet 2
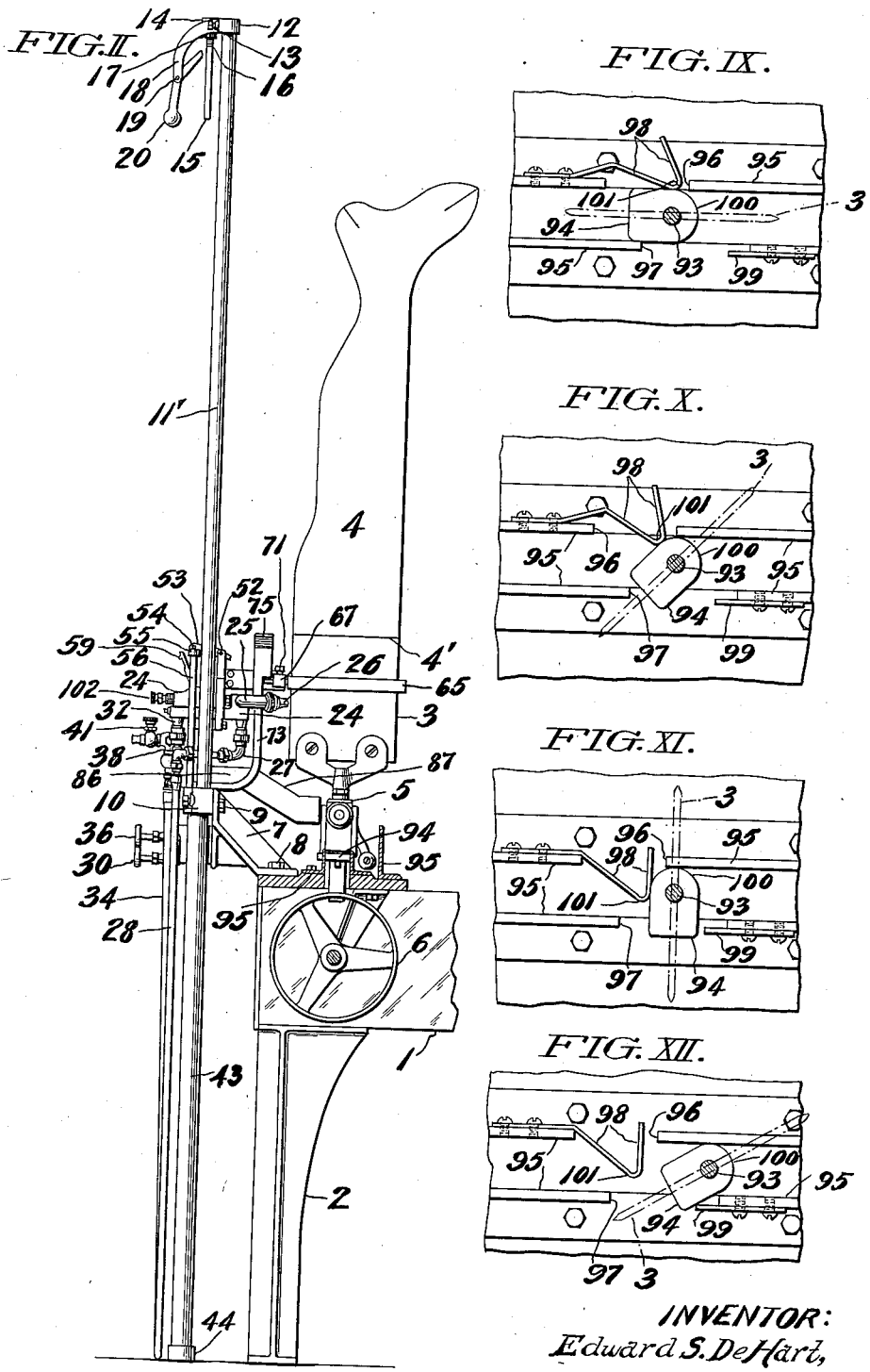
INVENTOR:
Edward S. DeHart,
BY Alfred J. Bratton
HIS ATTORNEY.

Oct. 26, 1937.  E. S. DE HART  2,097,365
AUTOMATIC MOISTURE DIFFUSING APPARATUS
Filed Sept. 12, 1935  7 Sheets-Sheet 3
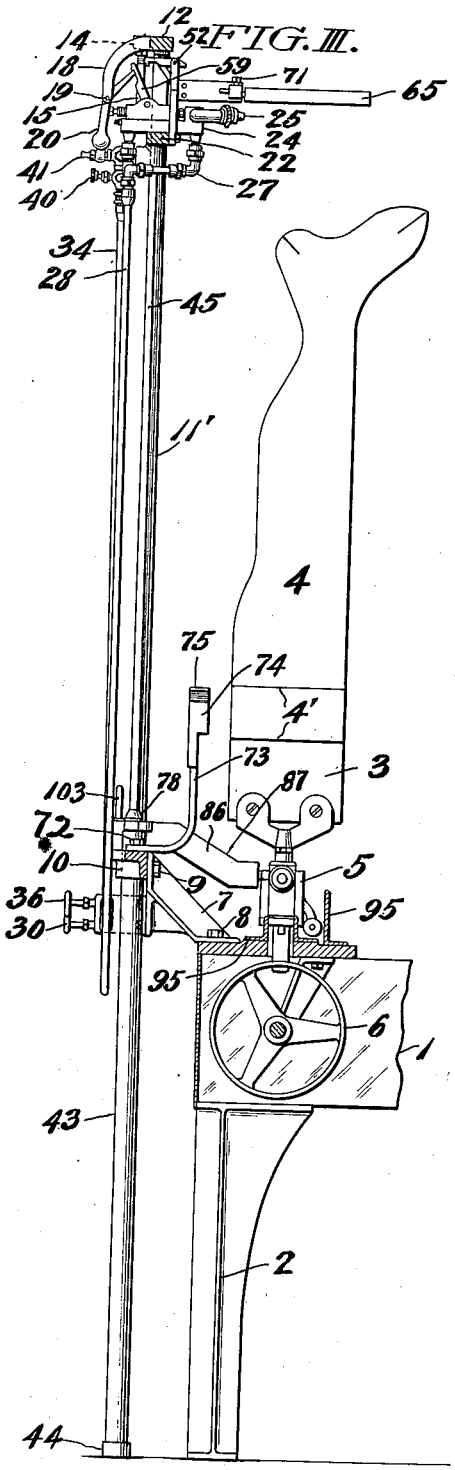
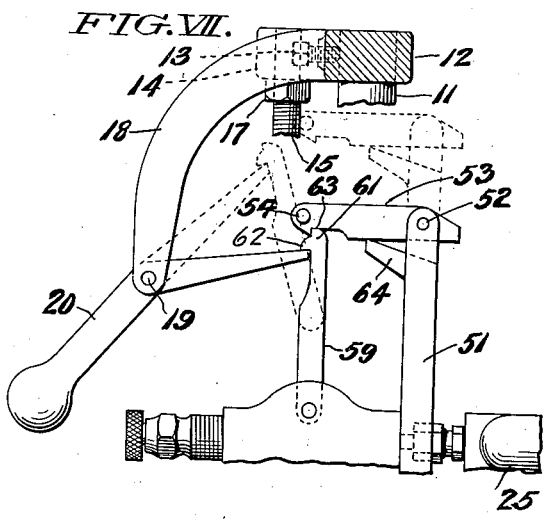
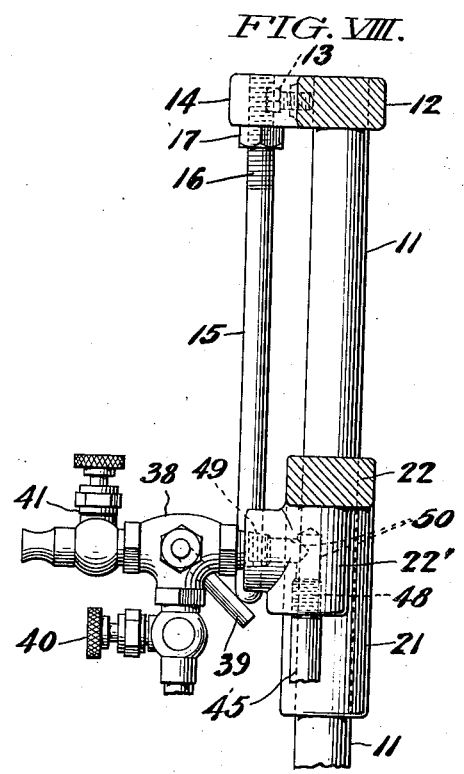
INVENTOR:
Edward S. DeHart,
BY Alfred J. Bratton
HIS ATTORNEY.

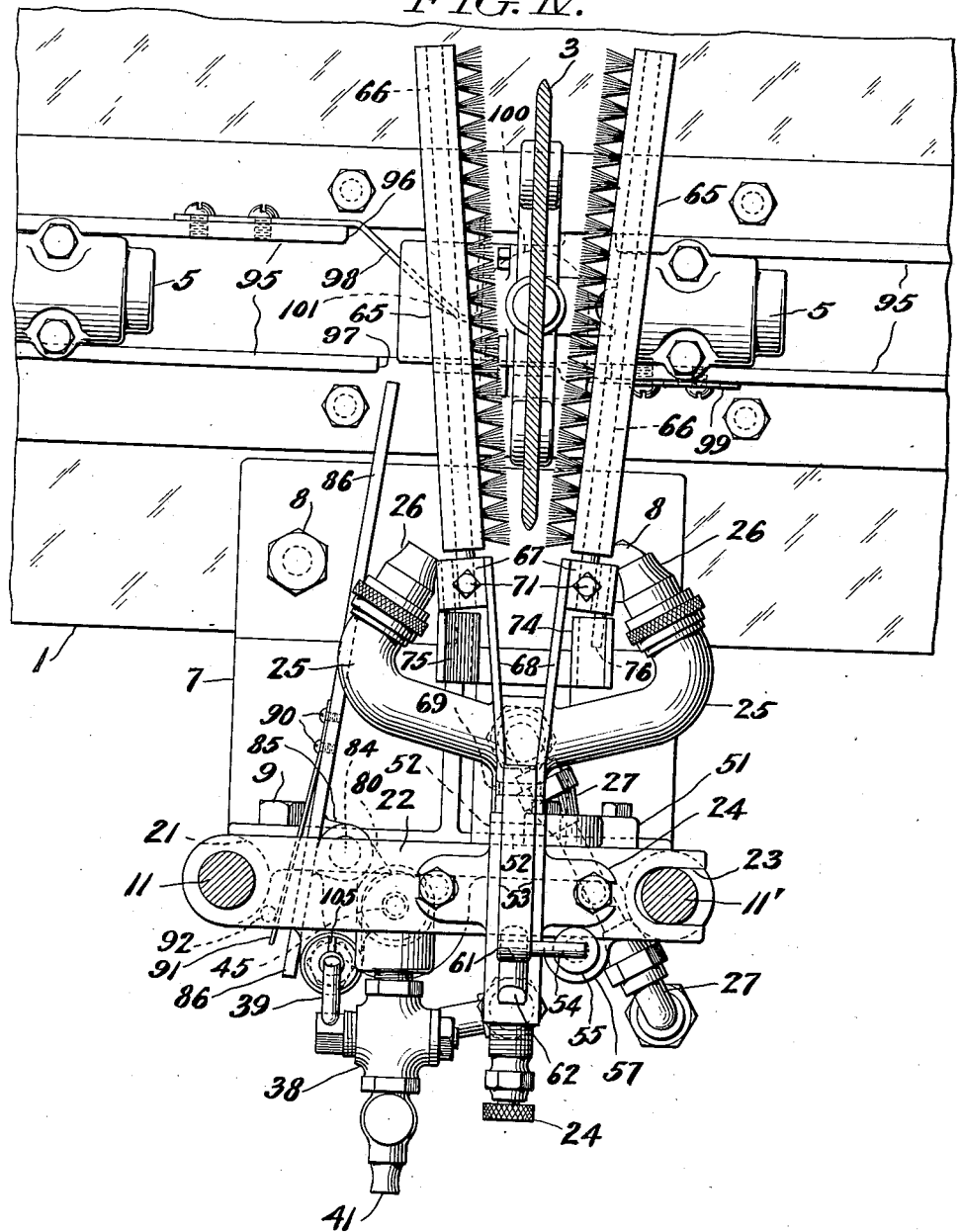

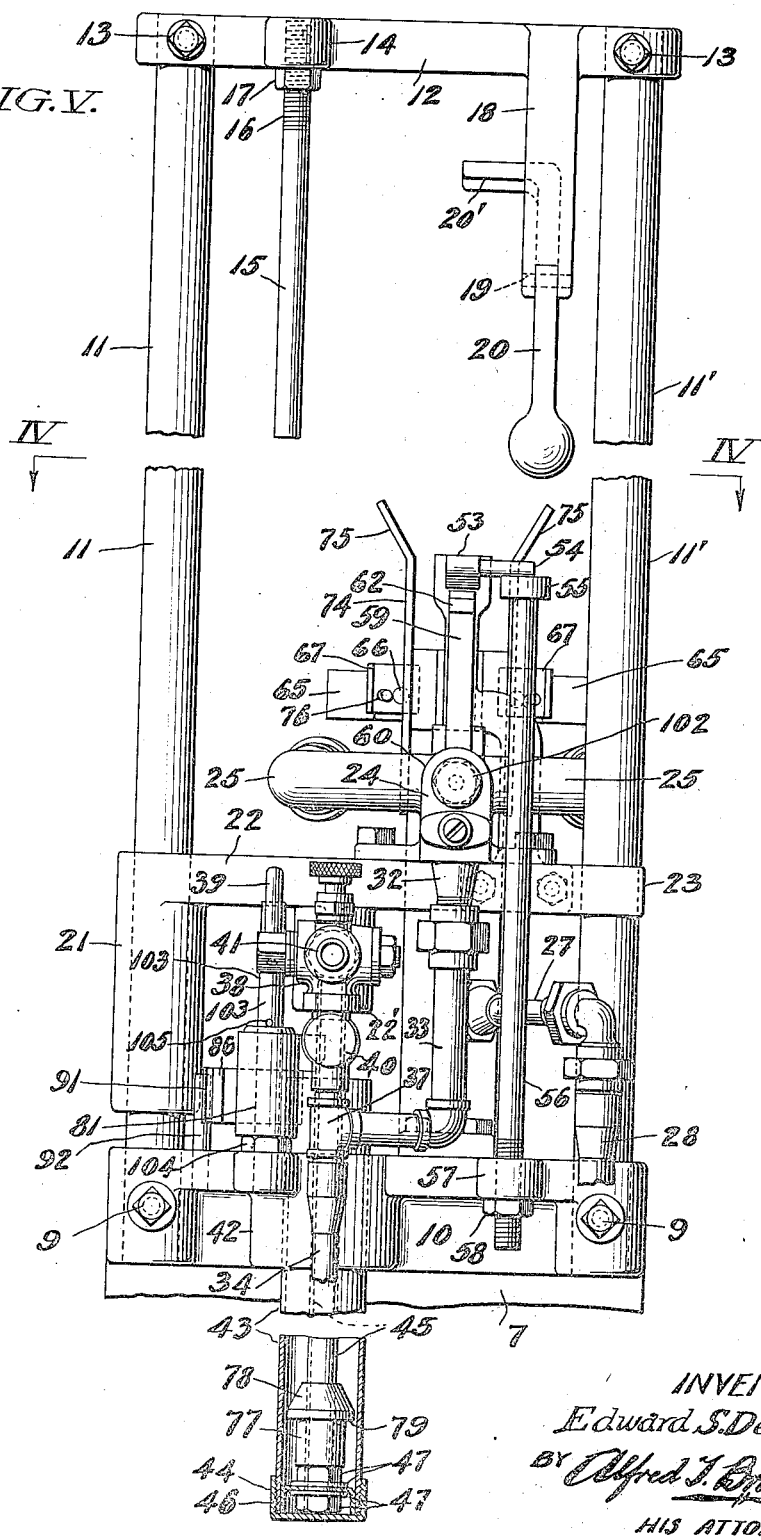

Oct. 26, 1937.  E. S. DE HART  2,097,365
AUTOMATIC MOISTURE DIFFUSING APPARATUS
Filed Sept. 12, 1935  7 Sheets-Sheet 6
FIG. VI.
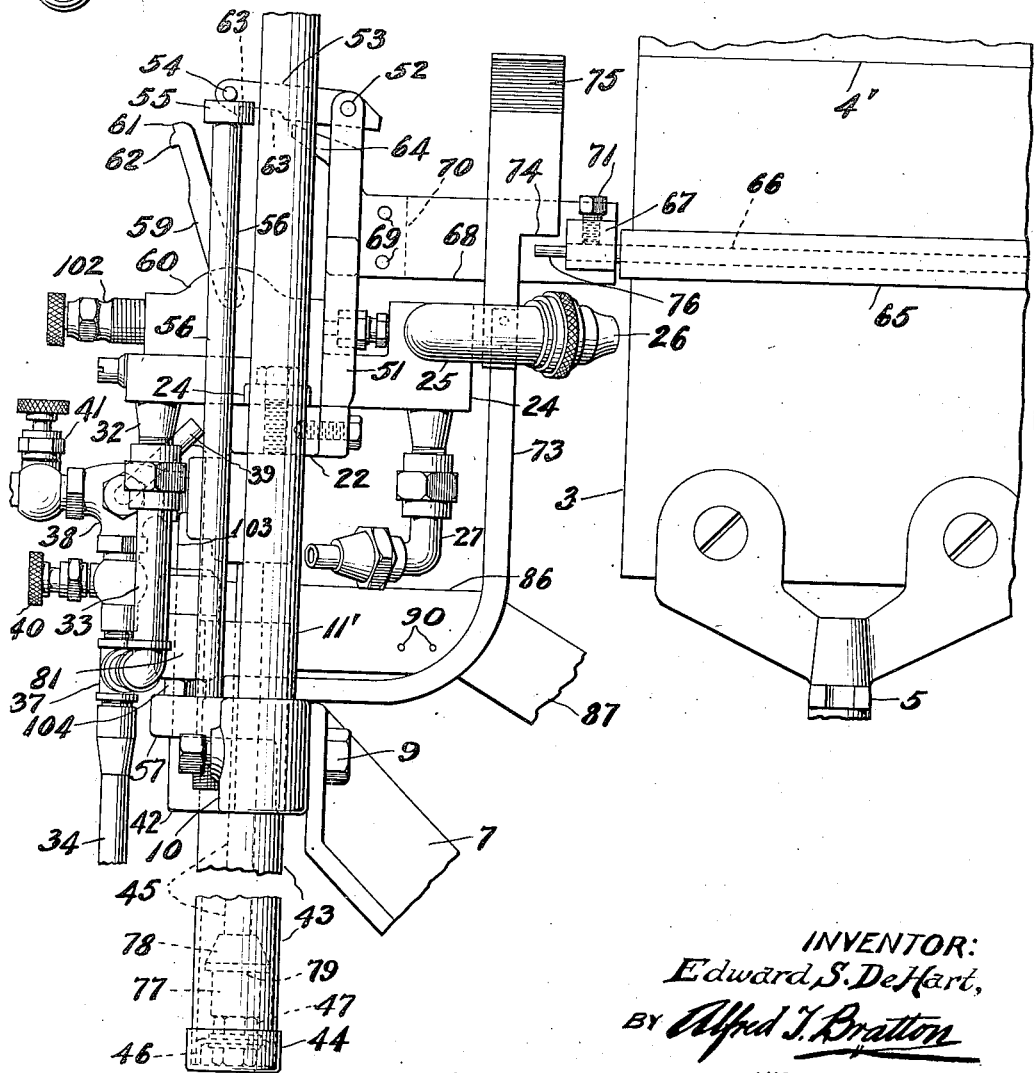
INVENTOR:
Edward S. DeHart,
BY Alfred T. Bratton
HIS ATTORNEY.

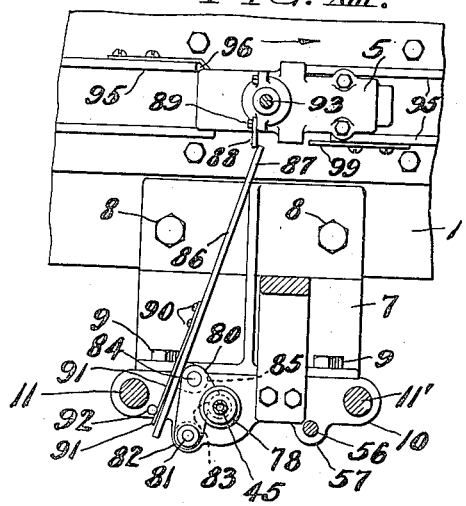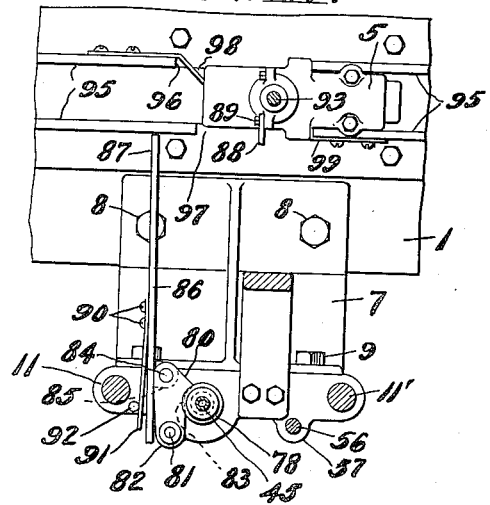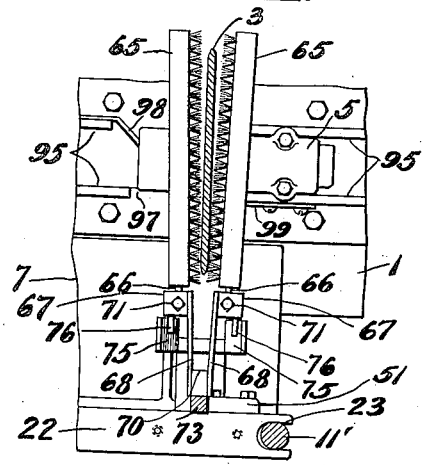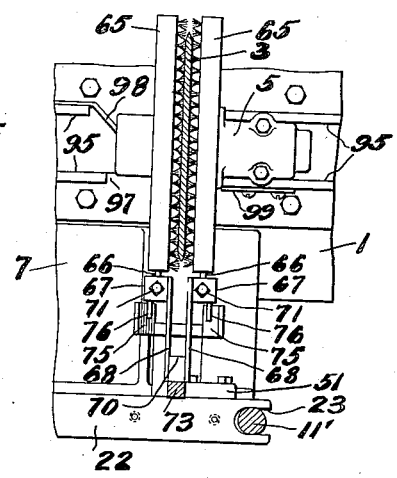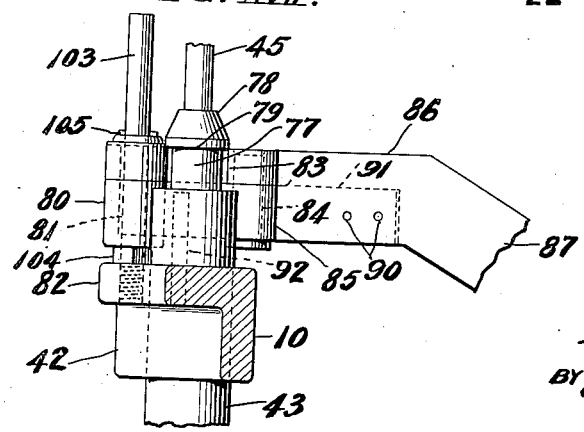

Patented Oct. 26, 1937

2,097,365

UNITED STATES PATENT OFFICE 2,097,365

AUTOMATIC MOISTURE-DIFFUSING APPARATUS

Edward Snow De Hart, Collingswood, N. J.

Application September 12, 1935, Serial No. 40,247

19 Claims. (Cl. 223—52)

This invention has reference in its broader aspect to a novel manner and means for moistening or sprinkling materials prior to, or after, drying or otherwise being handled for the purpose of restoring a desired condition for storage, sale or use; while it relates, more particularly, to an improved system and apparatus for the moistening or conditioning of knit and woven materials.

The primary object of this invention is the provision of an automatic spraying or moisture-diffusing apparatus for application preferably, although not essentially, to hosiery-drying apparatus in which the articles treated are mounted on forms adapted for progression through a drying chamber, such moisture-diffusing apparatus being actuated and arrested in synchronized relation with respect to the form progressing means.

Another object is the provision of a novel spraying means for the purpose above stated by the use of which an even moistening and smoothening-out of the article being treated is positively ensured; or, in other words, the entire area of such article will be subjected to an evenly distributed degree of moisture whereby "damp" or "over-dried" spots in the finished article are entirely eliminated.

A further object is to provide a novel apparatus of the type indicated in which the reciprocative movements of the moisture-diffusing means automatically actuates and shuts-off the spraying means.

A still further object is to provide a novel spraying means of the indicated type which is readily adjustable, and preferably adapted for application, to most standard types of hoisery drying machines.

This invention fully comprehends the foregoing and other objects, all of which will be explained in detail, and more readily understood when read in conjunction with the accompanying sheets of drawings that illustrate one practical embodiment thereof, it being therefore obvious that other arrangements and applications of the invention may be resorted to without departing from the spirit and scope of the concluding claims.

In the drawings:—

Fig. I is a part end elevation of a conventional hosiery drying machine having the improved automatic moisture-diffusing apparatus of this invention applied thereto, and with the spraying-means carrier in the position for its operative stroke.

Fig. II is an end elevation of the same, or looking towards the left-hand of Fig. I.

Fig. III is a similar view to the preceding one, but illustrating the spraying-means carrier elevated, or in its normal position of rest.

Fig. IV is a sectional plan view taken approximately as indicated by the arrows IV—IV in Fig. V.

Fig. V is a broken front elevation of the moisture-diffusing apparatus drawn to a larger scale for the sake of clearness.

Fig. VI is a side elevation of the same, or looking towards the left-hand of Fig. V.

Fig. VII is a detail elevation of a trip mechanism controlling the spraying means, and hereinafter more fully described.

Fig. VIII is a detail elevation of a control means for the pressure medium, whereby the apparatus is actuated.

Figs. IX, X, XI and XII are plan views showing a form turning means for placement of said form in proper position for tripping or releasing the moistening-apparatus and later on fully described.

Fig. XIII is a detail plan view illustrating the tripping or release mechanism of this invention whereby gravitation of the spray carrier from its inactive to the active position is accomplished.

Fig. XIV is a similar view showing the parts of Fig. XIII in another position.

Fig. XV is a detail plan view of a smoothing means in the inactive position relative to the form.

Fig. XVI is a similar view showing the smoothing means in the active position; and Fig. XVII is a detail view hereinafter fully explained.

Referring more in detail to the drawings and especially to Figs. I–IV, a fragmentary portion of a hosiery-drying machine table and track is comprehensively designated by the reference numeral 1, while 2 indicates one of the supports therefor, and 3 are drying forms of any conventional type adapted for the "boarding" of hose 4, in accordance with known practice. Each form 3 is pivotally supported by a suitable holder or shoe 5 adapted for progression along the table or track 1, and 6, Figs. II and III, indicates an appropriate rotary cam means, for example, for advancing the respective shoes 5; all of the foregoing mentioned parts being substantially in accordance with known practice and being simply referred to in order to better explain the invention now to be described.

The improved automatic moisture-diffusing apparatus of this invention comprises a base or supporting bracket 7 adapted for secure fixture to the table or track 1 by appropriate-attaching means 8. To the upper part of the bracket 7 is secured, as by means 9, a stationary head 10 affording rigid support for a pair of guide elements 11, 11', in turn retained in vertical parallel relation by a cross-head 12 fastened thereto by set screws 13, in an obvious manner. This cross-head 12 is provided with an apertured offset 14, for attachment of a pendent rod 15 adjustable by a screw-threaded section 16, and adapted to be firmly arrested at the desired elevation by a lock nut 17; while said cross-head also has a depending arm 18 that affords pivotal connection at 19 for a counterbalanced latch device 20, having an angled upper end 20', for a purpose later on explained.

Slidable longitudinally of the guide element 11 is the tubular part 21 of a carriage member 22, having its free end slotted at 23 for coaction with the other guide element 11', as best understood from Fig. IV; said carriage affording support for a laterally adjustable sprayer device or gun 24, of any approved type, having a fork 25 with adjustable nozzle tips 26 of any suitable form for distributing moisture evenly across both flat faces of the drying forms 3 aforesaid. Liquid, such as water under pressure, is supplied to the connection 25 by way of an elbowed swivel-joint 27 and flexible tube 28, from a service supply pipe 29 fitted with a stop valve 30, said pipe being supported by suitable brackets 31 carried by the base 7, hereinbefore referred to.

Air is supplied to the sprayer device 24 by way of a suitable coupling 32, elbow connection 33 and flexible tube 34, from a service supply pipe 35 fitted with a stop valve 36, said pipe being supported by the brackets 31 aforesaid. From Figs. V and VI it will be best seen that the elbow connection 33 includes a T 37 surmounted by a three-way control valve 38, having a cranked handle 39 for a purpose later on explained; while 40, 41, are adjustable valves respectively for varying the "inlet" and "exhaust" of air to and from the three-way valve 38.

Intermediate the ends of the stationary head 10 is an embossment 42 affording rigid connection for a tube 43 which is open at its upper end and closed-in at the lower end by a suitable cap 44, said tube serving in the capacity of an operating cylinder. Axially of the cylinder 43 is a tubular piston-rod 45 having at its lower end a plunger 46, conveniently a cupper-leather or the like, that is securely attached to said rod by lock nuts and washers 47. The upper end of the tubular piston rod 45 connects into an embossment 22' of the carriage 22 at 48, Fig. VIII, said embossment also having the three-way control valve 58 attached thereto at 49; flow communication between the bore of said rod and the valve 38 being established by an angle passage 50.

Secured to the back of the carriage member 22 is a vertical bracket 51 having a forked upper end affording pivotal bearing at 52 for a latch 53 with a lateral stop 54, for engagement by the upper headed-end 55 of an upright rod 56, screw threaded through a lug 57 on the stationary head 10, said rod being adapted to be secured at the requisite vertical adjustment by a lock-nut 58, in an obvious manner and for a purpose hereafter explained. 59 is a short spring-influenced lever secured at one end to the axis of a suitable cut-off in the spray control section 60 of the sprayer device or gun 24, said lever having its free or upper end provided with angularly related teeth 61, 62 respectively adapted for coaction with a cut-out or notch 63 in the latch 53 aforesaid and the laterally angled upper end 20' of the counterbalanced-latching device 20, hereinbefore referred to as carried by the cross-head 12, for purposes later on set forth. 64 is a stop projection on the bracket 51 limiting downward movement of the latch 53 and to prevent its becoming out of line with respect to the rod 56.

In order to provide an interrelated means for smoothing out the welt portions 4' of the "boarded" stockings 4, simultaneously with completion of the moistening operation, a pair of coactive brushes 65 are supported by axially located rods 66, in apertured offsets 67 of flexible or recoil elements 68 secured at their other extremities by suitable means 69, Figs. I and III, to a lateral-projection 70 on the bracket 51, in line with the form 3, as it passes the sprayer device 24. Screw studs 71 engaged in the offsets 67 not only accommodate adjustment of the brushes 65 relative to the plane of the form 3, but also serve to lock them when once so adjusted. In order to actuate the brushes 65, there is secured at 72, Fig. III, to the stationary head 10 a pair of spaced angular cam members 73, having their upper parts expanded at 74, with their free ends outwardly angled at 75, for coaction with pins 76 offset relative to the axes of the brushes 65.

In order to make provision for normally holding the carriage member 22 elevated, as shown in Figs. III and XVII, the tubular piston rod 45 has secured to its lower end a sleeve 77 having a coned upper part 78, of larger basal diameter than said sleeve, to provide a circumferential shoulder 79 for coaction with a pressure-influenced detent or pawl-catch 80 freely-pivoted at 81 to a lateral lug portion 82 of the stationary head 10. The pawl-catch 80 is shaped at 83 to a curvature corresponding with the diameter of the sleeve 77 so that when the coned upper part 78 moves upwardly over said curvature, the catch 80 will automatically snap-in below the shoulder 79 to hold the piston rod 45 and connected carriage 22 elevated or in its inactive position. Pivoted at 84 to the inner end of the pawl-catch 80 by a lug 85 is a rigid arm or element 86 having a downwardly-stepped portion 87 for engagement by a projection 88 from each form holder or shoe 5. This projection 88 is preferably in the nature of a trip piece conveniently attached to the holder or shoe 5 by one of the conventional bolts 89, so that no material change is involved in the latter by adaptation to this invention. As best appreciated from Figs. XIII and XIV, more particularly, the arm or element 86 has attached to its outer face by suitable means 90, a flat spring 91, the free end whereof engages a suitable abutment or pin 92 projecting upwardly from the stationary head 10. Assuming now that the consecutive form holders or shoes 5 are moving in the direction of the arrow shown on Fig. XIII, it will be readily seen that as the stepped portion 87 of the arm or element 86 impacts the projection 88, that the former will be swung angularly from the position of Fig. XIV to that of Fig. XIII. Incident to such movement of the arm 86 the recoil action of the flat spring 91 will be increased, while at the same time the pawl-catch 80 will be pressed inwardly or turned clockwise till its curved notch 83 engages below the shoulder 79 of the sleeve 77, and all in opposition to the abutment of pin 92. Immediately the projection 88 is released from coaction with the arm free end 87, the arm 86 will snap back, under the recoil action of the spring 91, to the position of Fig. XIV with automatic return of the associated parts in a manner obvious from an inspection of the views above referred to.

In order to hold the forms 3 momentarily at rest, during the operation of the novel moisture-diffusing and material smoothing apparatus of this invention, reference is now to be had to Figs. IX-XII wherein the form pivot pin is designated as 93, and 94 indicates a conventional foot piece for engagement by the cam means 6 to effect progression of the consecutive forms 3. This foot piece 94 is normally progressed between appropriate guides 95 with all of said forms aligned, heel to toe foremost, in the direction of normal progression, as well known in the art. However, in order to place or turn each consecutive form 3 into proper position, or at right angles to the normal line of progression, for operation of the moisture-diffusing means, the guides 95 are provided with relatively staggered gaps 96, 97, in the former of which projects a substantially V-shaped flexible element 98, while the latter has an opposed spring tongue or projection 99 aligned therewith. Now it will be clear that as the foot-piece rounded-end 100 moves to the right-hand in Fig. IX, the angular rounded-end 101 of the V-shaped element 98, will effect turning of the foot-piece 94 through the position of Fig. X to that of Fig. XI, where it will be momentarily held with the form 3 at right-angles to the normal line of progression, during which period of arrestation the moistening operation takes place as hereafter explained. As the foot-piece 94 moves forwardly, in any of the known ways, it will automatically be restored to its normal or rounded-end 100 foremost position, by coaction with the tongue or projection 99 in a manner clearly understandable from Fig. XII without further elaboration herein.

102 is an adjustable valve in the air section 60 for controlling the flow of air to the spray connection 25; and 103 is an upward extension of the pivot 81 for a purpose hereafter explained; while it will be seen that said pivot is in the form of a vertical rod having threaded engagement in the lateral lug 82, with a lock nut 104 whereby its elevation relative to the stationary head 10 is determined. Furthermore it is to be noted that the pawl-catch 80 is freely mounted on the pivot pin 81, above the lock nut 104, and that it is restrained against displacement by a suitable cotter 105.

From the foregoing disclosure it is believed that the operation of the apparatus will be understandable, but briefly stated and assuming that the service supply water and air valves 30, 36 are open, with the carriage 22 elevated as best shown in Fig. III, and so held by the pawl-catch 80. Now it will be readily appreciated that as a form 3 is turned into the position of Fig. XI, such movement will effect release of the pawl-catch 80 from arrestive-engagement with the shoulder 79 of the tubular piston rod 45, and resultant freeing of the latter for gravitational descent in the tubular cylinder 43. The counterbalanced latch 20 is next caught by the tooth 62 of the air control lever 59, and the notch 63 of the latch 53 engages on the tooth 61 of said lever, and holds the spray control device 60 in open position. Immediately the carriage 22 commences its down gravitation the short lever 59 will be moved from the dotted position of Fig. VII to the full line showing, in the same view, opening of the control valve 60, where it is held by the tooth 61 engaging in the notch 63 of the latch 53. As the carriage 22 continues its descent, and the moisture-diffusing operation takes place by aid of the spraying device 24, and approaches the upper level of the inclines or angled upper ends 75 of the cam members 73, the brush pin 76 will coact inwardly therewith and collapse the brushes 65 against the hose 4 on the form 3 in the region of the welt 4' and thereby effectively smooth-out said hose downwardly on the form 3, in opposition to the recoil tendency of the flexible members 68. As the pins 76 slide downwardly until they pass the lower edges of the expanded parts 74 of the cam members, it is obvious the brushes 65 will effect a proper smoothing-out of the welt end portion of the hose 4, but instantly such pins pass below the parts 74, the brushes 65 will again be expanded relative to the form 3 by the recoil action of the flexible members 68. Substantially concurrent with release of the brush controlling members 68 from coaction with the parts 74 of the cam members 73, the lateral stop 54 of the latch 53 impacts the head 55 of the rod 56 and is released from engagement with the tooth 61 of the lever 59, whereupon the latter automatically moves back to the position shown in Fig. VI, thereby cutting-off air flow to the sprayer tips 26. Simultaneously with the events just described the cranked handle 39 of the three-way control valve 38 has been engaged by the extended part 103 of the pivot 81 and moved upwards for diversion of the pressure air by way of the angled passage 50 into the hollow piston rod 45 for elevation of the latter with the connected carrier 22 to the normal position, hereinbefore mentioned, and simultaneous opening of the three-way valve 38 by engagement of the pendent rod 15 with the cranked handle 39 thereof, whereby the pressure air below the plunger 46 is enabled to escape by way of the hollow of the piston rod 45, angled passage 50, and exhaust valve 41 ready for the succeeding moisture-diffusing operation, as will now be readily understood by those conversant with the art.

Obviously the spray connection 25 may be mounted with a swivelling connection to the device 24 in order to vary the up-or-down angular diffusion of the spray relative to the form 3; also it will be readily understood that the elevating stroke of the piston plunger 46 will normally be much more rapid than the descending stroke, but that it can be variably regulated by the inlet valve 40, in an obvious manner.

The foregoing disclosure is given merely by way of example and is not to be considered as limitative in any respect, but as merely one embodiment thereof, while the scope of this invention will be determinable from an understanding of said disclosure as a practical example of the invention, and with a recognition of the numerous advantages which said invention produces in its illustrated form.

Finally it is to be distinctly understood that in practice various changes in the form, proportion, size and other details of construction, within the scope of the following claims may be resorted to without departing from the spirit, or sacrificing any of the advantages of the hereinbefore described invention.

Having thus described the invention, I claim:
1. In diffusing apparatus, a support, upright guide means carried by said support, a head mounted on said guide means in spaced relation to said support, a carrier with a spray-producer reciprocable along the guide means, means supplying pressure and diffusible medium to the spray producer, automatically-actuated means including a valve, and means connected with the support at the lower end of the guide means adapted to operate the valve to divert the pressure medium from the spray-producer as the carrier approaches its limit of movement in one direction to effect movement of said carrier in the reverse direction.

2. In diffusing apparatus, a support, vertical guide means carried by said support, a crosshead mounted on said guide means in spaced relation to said support, a carrier with a spray-producer movable along the guide means, means supplying pressure and diffusible medium to the spray producer, an automatically-actuated control means including a valve, and means connected with the support at the lower end of the guide means to operate the valve to divert the pressure medium to effect elevation of the carrier, and means whereby said carrier is freed for downward gravitation.

3. In diffusing apparatus, a support, vertical guide means carried by said support, a crosshead mounted on said guide means in spaced relation to said support, a carrier with a spray-producer movable along the guide means, means supplying pressure and diffusible medium to the spray producer, an automatically-actuated control means including a valve, and means carried by the support at the lower end of the guide means adapted to engage the valve to divert the pressure medium from the spray producer to effect elevation of the carrier, and means whereby said carrier is released for downward gravitation with concurrent exhaust of the pressure medium used for its elevation, and means actuated by the descending carrier to evenly distribute the diffused medium near the termination of its descent with concurrent cutting-off of the spraying operation.

4. In diffusing apparatus, a support, vertical guides carried by said support, a crosshead mounted on said guides in spaced relation to said support, a carrier with a spraying-device reciprocable along the guides, means supplying pressure and diffusible mediums to the spraying-device, an automatically-actuated control whereby the pressure-medium is diverted to effect elevation of the carrier, means whereby the carrier is released for downward gravitation with concurrent exhaust of the pressure medium used in its elevation, brush means actuated by the descending carrier to evenly distribute the diffused medium near the termination of its descent with concurrent cessation of the spraying operation, and means for temporarily arresting the carrier at the end of each up and each down movement.

5. In diffusing apparatus, a support, vertical guides carried by said support, a crosshead mounted on said guides in spaced relation to said support, a carrier with a spraying-device reciprocable along the guides, means supplying pressure and diffusible mediums to the spraying-device, an automatically-actuated control whereby the pressure-medium is diverted to effect elevation of the carrier, means whereby the carrier is released for downward gravitation with concurrent exhaust of the pressure medium used in its elevation, brush means actuated by the descending carrier to evenly distribute the diffused medium near the termination of its spraying operation, a support for the article to be treated, means for progressing said support, and means whereby said support is turned into operative relation with the spraying device with synchronized actuation and shutting-off of said device.

6. In moisture-diffusing apparatus, a base for attachment to a rigid structure, said base having vertical guides connected at their upper ends by a crosshead, a carrier with a spraying-device reciprocable along said guides, means supplying air and a liquid under pressure to the spraying-device, an automatically-actuated three-way control whereby the pressure air is diverted to effect elevation of the carrier, means whereby the carrier is released for downward gravitation with concurrent exhaust of the pressure air used in its elevation, opposedly-operative brushes actuated by the descending carrier to evenly distribute the diffused moisture proximate the termination of its descent with concurrent shutting-off of the diffusing operation, catch means temporarily arresting movement of the carrier at each up and each down movement, a progressible pivoted-form for the article to be treated, means whereby said form is automatically turned into and out of operative relation with the spraying device with synchronized actuation and shutting-off of said device.

7. In moisture-diffusing apparatus, a base having vertically adjustable guides connected at their upper ends by a cross-head, a cylinder supported by the base having its upper end open and its lower end closed in, a tubular member movable in the cylinder and having a piston at its lower end, a carrier with a spraying-device reciprocable along the vertical guides and having the upper end of the tubular member connected thereto, a three-way control on the carrier with means affording communication into the tubular member bore, means supplying air under pressure and water to the spraying device, means whereby the three-way control is actuated to divert pressure air through the tubular member to effect elevation of the carrier with concurrent cessation of the moisture-diffusing operation, a pressure-influenced catch for coaction with the tubular member to arrest upward movement of the carrier, means for releasing said catch to permit downward gravitation of the carrier, means thereafter operable by the descending carrier to actuate the spraying-device and hold the same in open position, article smoothing devices supported by the carrier, means effective to move the smoothing devices into operative position during descent of the carrier and to effect their release for recoil action, means effective substantially-concurrent with such release of the smoothing devices to automatically shut-off the spraying operation, and means to operate the three-way control for exhaust of the pressure air below the piston by way of the tubular member and said control.

8. The combination with a progressible pivotally-mounted drying form having a direction guiding shoe, of a moisture-diffusing apparatus comprising a support with parallel guides connected by a crosshead in spaced relation to said support, a cylinder carried by the support and having the proximate end open with the remote end closed, a plunger reciprocable in the cylinder and having a tubular piston rod, a carrier with a spraying device movable along the parallel guides and having the outer end of the piston rod secured thereto, a three-way valve on the carrier having communication into the bore of said rod and a variable exhaust outlet, means supplying air under pressure and water to the spraying device, means for turning the three-way valve into position for effecting diversion of the pressure air from the spraying device, concurrent with cessation of moisture-diffusion, through the tubular piston rod to effect movement of the plunger and carrier outwards relative to the open end of the cylinder, means providing a circumferential shoulder about the piston rod proximate the plunger, a spring-influenced catch pivotally-mounted on the base aforesaid and adapted for coaction with the piston rod enlargement to arrest outward movement thereof and hold the carrier in normal spaced relation to said base, means for coaction with a member fixed to the form pivot to effect turning of the form into planar relation with the spraying device as it approaches the latter with synchronized actuation of said device to effect the moisture-diffusing operation and concurrent return of the plunger and carrier to the "in" position, and means for turning the form into normal progressive position simultaneously with cessation of the moisture-diffusing operation.

9. The combination with a progressible pivotally-mounted drying form having a direction guiding shoe, of a moisture-diffusing apparatus comprising a support with parallel guides connected by a crosshead in spaced relation to said support, a cylinder carried by the support and having the proximate end open with the remote end closed, a plunger reciprocable in the cylinder and having a tubular piston rod, a carrier with a spraying device movable along the parallel guides and having the outer end of the piston rod secured thereto, a three-way valve on the carrier having communication into the bore of said rod and a variable exhaust outlet, means supplying air under pressure and water to the spraying device, means for turning the three-way valve into position for effecting diversion of the pressure air from the spraying device, concurrent with cessation of moisture-diffusion, through the tubular piston rod to effect movement of the plunger and carrier outwards relative to the open end of the cylinder, means providing a circumferential shoulder about the piston rod proximate the plunger, a spring-influenced catch pivotally-mounted on the base aforesaid and adapted for coaction with the piston rod enlargement to arrest outward movement thereof and hold the carrier in normal spaced relation to said base, means for coaction with a member fixed to the form pivot to effect turning of the form into planar relation with the spraying device as it approaches the latter with synchronized actuation of said device to effect the moisture-diffusing operation and concurrent return of the plunger and carrier to the "in" position, recoil-influenced brushes projecting from the carrier, cam means carried by the support aforesaid effective to collapse the brushes against the drying form during conclusion of the spraying operation, said cam means also serving to release the brushes concurrent with shutting-off of moisture-diffusion and diversion of the pressure air as aforesaid, and means to concurrently turn the form into normal progressive position.

10. The combination with a progressible pivotally-mounted drying form having a direction guiding shoe; of a rigidly fixable base with vertical guides connected at the top by a cross-head; a cylinder supported by the base with its upper open end projecting above said base and its lower closed-in end pendent therebelow; a plunger in the cylinder having a tubular axis rod, the upper open end whereof is secured in a head slidably engaging the vertical guides; a sprayer-device adjustably mounted on said head; a three-way plug valve, with a projecting manipulator, having connection through the head into the axis rod bore and a variable exhaust outlet; means supplying air under pressure and water to the sprayer-device; adjustable projections from the base and cross-head for coaction with the valve manipulator to respectively turn the valve into position for elevating the slidable head and sprayer device, and similarly move the valve to effect moisture-diffusion having downward gravitation of said head; a counterbalanced latch carried by the cross-head and operative to move a control on the sprayer-device into open position as the head initially descends; catch means supported by the head and coactive with the sprayer-device control to hold the latter in open position as it is released from the counterbalanced latch with continued gravitation of said head and concurrent exhaust of the pressure air by way of the plunger axis rod bore and variable outlet from below said plunger; flexible recoil elements laterally projecting from the movable head supporting brushes adapted to coact with the drying form to smooth out the article thereon as said head nears the end of its descending movement; spaced cam devices having active portions for engagement with projections from the brush inner ends to effect coaction thereof with the drying form and release therefrom under recoil of the flexible supporting elements; a pressure-influenced horizontally operative detent pivotally supported on the movable head and adapted for engagement below a shouldered enlargement on the tubular axis rod above the plunger and thereby hold the head normally elevated, said enlargement having a portion effective to swing the detent outwardly for snap action therebelow as aforesaid; a rigid arm fulcrumed to the detent and having a stepped portion for engagement by a trip on the form shoe and thereby effect release of the detent from arrestive engagement below the plunger enlargement for descent of the movable head; and an upward adjustable projection on the base wherewith the catch means holding the spraying control engages to effect its release and stoppage of the spraying operation simultaneously with movement of the three-way valve for elevation of the movable head.

11. The combination of claim 10 wherein the three-way-valve has a cranked manipulator, and the movement effecting elements are in the form of rods, one of which is pendent from the cross-head and the other is upstanding from the stationary base.

12. The combination of claim 10 wherein the three-way-valve plug has a radial cranked turn-piece, the upper movement effecting element consists of a vertically adjustable pendent rod carried by the cross-head, and the lower movement effecting element consists of an extension of the vertically adjustable pivot for the horizontally-operative detent effective to hold the movable head normally in elevated position.

13. The combination of claim 10 wherein the counterbalanced latch is in the form of an overbalanced member pivotally supported by a depending arm from the cross-head, and said member has a laterally angled upper end for coaction with the sprayer-device control.

14. The combination of claim 10 wherein the sprayer device control is in the form of a lever having angularly related teeth at its outer end, and the catch means to hold said control in open position comprises a bracket on the movable head affording pivot bearing for a vertically movable latch engageable with one of the angled teeth aforesaid, said latch has a lateral stop for engagement with trip means projecting upwardly from the apparatus base to effect cessation of the spraying operation, and the other angled tooth of said lever is engageable by the laterally angled upper end of the counterbalanced latch to effect commencement of such spraying operation.

15. The combination of claim 10 wherein the smoothing brushes are supported by rods afforded bearing at one end in apertured offsets of recoil members secured to the cross-head, means is provided for adjusting and securing said brushes, and the cam devices for actuating said brushes are in the form of spaced angular members, rigidly sustained by the base, with their free ends expanded and outwardly angled, for coaction with offset pins in the proximate ends of the brushes.

16. The combination of claim 10 wherein the horizontally operative detent effective to hold the plunger rod and movable head in elevated position is in the form of a recoil-influenced pawl-catch pivoted to the apparatus base, and said catch has a curved active portion for engagement below the coned upper portion of a sleeve securely fixed to the plunger rod in proximity to the plunger.

17. The combination of claim 10, wherein the horizontally operative detent affords pivotal support for a rigid arm having a stepped portion remote from its pivot and a portion for coaction with the back of said detent, a flat spring is attached to said arm with its free end in engagement with an abutment on the apparatus base, and the form carrier shoe is provided with a trip projection for coaction with the rigid arm free end to effect release of the detent from active position and its return under boosted recoil influence.

18. The combination of claim 10 wherein the means for turning the pivoted drying form comprise a foot piece on the form pivot below its carrier shoe, and the turning means comprise a substantially V-shaped flexible element and a diagonally positioned rigid projection, said flexible element projecting into a gap in one of parallel foot piece guiding elements, and the rigid projection overlapping a relatively-staggered gap in the other guide element.

19. In diffusing apparatus, a support, upright guide means carried by said support, a head mounted on said guide means in spaced relation to said support, a carrier with a spray-producer reciprocable along the guide means, means supplying pressure and diffusible medium to the spray-producer, an automatically actuated control means including a valve, and means carried by the support at the lower end of the guide means to operate the valve to divert the pressure medium from the spray-producer to effect movement of the carrier in one direction, and means at the upper end of the guide means adapted to divert the pressure medium to effect the diffusing operation during reverse movement of said carrier.

EDWARD SNOW DE HART.